(12) United States Patent
Hirota

(10) Patent No.: US 8,147,336 B2
(45) Date of Patent: Apr. 3, 2012

(54) COMPETITIVE GAME SYSTEM, METHOD, APPARATUS AND PROGRAM WHICH CAN BE PLAYED VIA NETWORK

(75) Inventor: Ryuhei Hirota, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1859 days.

(21) Appl. No.: 11/164,533

(22) Filed: Nov. 29, 2005

(65) Prior Publication Data

US 2006/0199644 A1    Sep. 7, 2006

Related U.S. Application Data

(63) Continuation of application No. PCT/JP2004/007361, filed on May 28, 2004.

(30) Foreign Application Priority Data

May 29, 2003  (JP) ................................. 2003-152067

(51) Int. Cl.
*A63F 9/24* (2006.01)
*A63F 13/00* (2006.01)
*G06F 17/00* (2006.01)
*G06F 19/00* (2006.01)

(52) U.S. Cl. ..................................................... 463/42

(58) Field of Classification Search ..................... 463/42
See application file for complete search history.

(56) References Cited

U.S. PATENT DOCUMENTS
5,838,909 A * 11/1998 Roy et al. ..................... 709/209

FOREIGN PATENT DOCUMENTS
JP    2001/149658 A    6/2001
JP    2004/174091 A    6/2004
* cited by examiner

*Primary Examiner* — David L Lewis
*Assistant Examiner* — Reginald Renwick
(74) *Attorney, Agent, or Firm* — Global IP Counselors, LLP

(57) ABSTRACT

A competitive game method which can be executed via a network is achieved irrespective of the type of the game. Terminal devices receive personal data from a center server, and respectively determine whether it will become a master terminal device in an initial game progress unit based on master determination rules. After the initial master terminal device is determined, a game is started. The master terminal device determines the next master terminal device when the initial game progress unit is completed. The master terminal device transmits a switching notification designating the next master terminal device by, for example, describing an IP address to the other terminal devices. The master terminal device further transmits game data which is necessary for continuing the game to the next master terminal device.

9 Claims, 18 Drawing Sheets

Input data

> Input from lever (up, down, right and left)
> Input from buttons (five buttons)

*Fig. 6A*

Output data

> Player data for 22 players (positions, directions, movements)
> Position and direction of ball
> Info. for referee (positions, directions, movements)
> Info. for cameras (directions, movements)
> Number of the player on which cursor is positioned
> Points, Time

*Fig. 6B*

Game data

> Remaining physical strength of 22 players
> Number of yellow cards and red cards of players
> Number of shots so far
> Number of fouls so far
> Points
> Names of teams
> Player data

*Fig. 6C*

Condition 1: Become master in descending order of IP address
Condition 2: Switch master every time game progress unit is finished until one cycle is finished
Condition 3: Terminal device having the shortest master experience time becomes master after one cycle Remaining physical strength of 22 players
Number of yellow cards and red cards of players
Number of shots so far
Number of fouls so far
Points
Names of teams
Player data
Master experience time of terminals

*Fig. 14*

COMPETITIVE GAME SYSTEM, METHOD, APPARATUS AND PROGRAM WHICH CAN BE PLAYED VIA NETWORK

TECHNICAL FIELD

The present invention relates to games which can be played against each other by terminal devices connected via networks. Particularly, the present invention relates to high-action games in which the speed at which a player responds to the screen output and audio output has a significant impact on the progress of the game.

BACKGROUND ART

Examples of games which can be played against each other by a plurality of players via networks such as the Internet include mah-jongg games and some types of role-playing games. Usually, in a competitive game which is played via networks, one of the terminal devices operated by the players will become the master and other terminal devices will become clients. The master terminal device manages the progress of the game. The client terminal devices output images and other data as the game progresses.

More specifically, the master terminal device: 1) receives commands that are input by one of the players; 2) receives command data from the client terminal devices that was input to the client terminal devices by the other players; 3) manages the progress of the game based on the commands input at the master terminal device and the commands input from the client terminal devices; 4) controls the screen output and the audio output at the master terminal device based on the progress of the game; and 5) transmits output data indicating the progress of the game to the client terminal devices. On the other hand, the client terminal devices 1) receive commands that are input by the players; 2) transmit the commands input by the players as command data to the master terminal device; 3) receive data output from the master terminal device; and 4) control screen output and audio output based on the received output data.

Network play has been achieved in table games such as mah-jongg games and some types of role-playing games. However, network play has yet to be achieved in action games such as shooting games, racing games, ball games, real-time simulation games, and war games. This is because there is known to be lag times in response during the game between the master terminal device and client terminal devices in network play, even though real-time responses which reflect the operations by the players is desired in action-type games.

In other words, a time lag is expected between the point at which a command is input by a player and the point at which that command is reflected in the screen display and/or audio output. This is because the client terminal devices cannot update the screen or output audio unless they receive output data such as frame data, audio data, and the like from the master terminal device via the network. However, in the process of transmitting the output data from the master terminal device to the client terminal devices, network delay and packet loss may occur for various reasons.

Network delay does not cause a problem in mah-jongg games and the like. This is because a delay between the point at which a command is entered by a player and the point at which that command is reflected in the screen output and/or audio output does not affect the game result as much as it does in action-type games. Even when there is packet loss, the influence of the packet loss on the game is small since there is only a small change in the screen display and audio in mah-jongg games and the like.

On the other hand, in highly active games, network delays and packet loss may cause disadvantages to the players on the client terminal devices compared to the player on the master terminal device. This prevents this type of game from being played via networks. In highly active games, network delays in screen output and/or audio output at the client terminal devices are significant compared to those at the master terminal device, and may affect the outcome of the game. Further, if packet loss occurs in a game in which the movements of objects within the game space are important, the screen display may be disturbed and the players at the client terminal may find it uncomfortable, and the outcome of the game may even be affected. Despite these kinds of problems, it would be desirable to achieve network play in various types of games because society is becoming more dependent on networks.

An object of the present invention is to realize competitive games which can be played via networks irrespective of type.

Another object of the present invention is to eliminate the impact on a player's game environment of the difference in responsiveness between the master terminal device and the client terminal devices in a competitive network game, irrespective of the type of game.

DISCLOSURE OF THE INVENTION

In order to solve the above-described problems, a first aspect of the present invention provides a competitive game system which includes terminal devices connected via a network, with one of the terminal devices being a master which manages game progress and other terminal devices being clients. In the game system:

a game that includes a plurality of game progress units is played by transmitting and receiving data via the network to and from the master terminal device and the client terminal devices;

before a start of one game progress unit, the master terminal device for the game progress unit to be started is determined;

the master terminal device is switched after the one game progress unit is completed; and the master terminal device does not accept data from the client terminal devices when the master terminal device is being switched.

In this game system, the master terminal device is switched during the game. The master terminal device is switched after a game progress unit is finished. During switching of the master terminal device, the master terminal device will neither accept command data input at the client terminal devices nor command data input at the master terminal device itself.

The game is formed of a plurality of game progress units. The game progress units may be, for example, the first half and second half of a soccer game, the top and bottom of an inning in a baseball game, games in a tennis match, or rounds in a boxing match. Furthermore, the time between time periods during which the terminal devices will not accept input data from the players can be set as a game progress unit. For example, in soccer game, command data input from the players will not be accepted during the halftime between the first half and the second half, and when a foul has been committed. Every time such an event occurs, the game progress unit may be completed, and the master terminal device may be switched. It is preferable if the game progress units are intervals between time periods which may serve as breakpoints in the progress of the game, because a multiplier effect can be achieved between the game process and the master switching process.

It is also possible to set a predetermined length of time in the game as a game progress unit irrespective of the progress of the game. Specifically, a predetermined time T may be set as one game progress unit, and the master terminal device may be switched for each time T.

The present invention is preferably applied to game systems for playing highly active types of games. In other words, the present invention is preferably used in games in which the response to a player's commands has a large impact on the outcome of the game. This is because there will be a quicker response to commands input by a player using the master terminal device, and thus the player can play the game with an advantage. By switching the master terminal device in turn during the game, all the terminal devices are given the opportunity to play the game with an advantage. The opportunities for the players to play highly active types of games with an advantage can be enjoyed by the players substantially equally.

A second aspect of the present invention provides a competitive game system according to the first aspect, wherein game data which is necessary for continuing the game is transmitted from the master terminal device to another terminal device that is become the next master terminal device; and the master terminal device will not accept data from the client terminal devices at least during the transmission of the game data.

Since the game data is passed on in turn by the master terminal device, the game can be played by the game system as a whole even though the master terminal device is switched.

A third aspect of the present invention provides a competitive game system according to the first aspect, wherein the master terminal device notifies the client terminal devices of the completion of the game progress unit, and the client terminal devices which receive the notification halt transmission of data to the master terminal device.

Since useless data transmission from the client terminal devices to the master terminal device is halted after a game progress unit is completed, the load on the network can be alleviated and the processing load on the master terminal device can be alleviated.

A fourth aspect of the present invention provides a competitive game system according to the first aspect, wherein the master terminal device is switched when the terminal devices do not receive input from players during the progress of the game.

For example, it is preferable if the terminal device is switched during halftime or when a foul has been committed in a soccer game, or is switched at the top and bottom of an inning in a baseball game, because the multiplier effect between the game process and the master terminal device switching process can be achieved.

Another embodiment of the present invention may be a competitive game system which can be played via a network, wherein a switching notification that includes the designation of the terminal device determined to become the next master terminal device is transmitted from the current master terminal device to the terminal device determined to become the next master via the network before transmission of the game data.

Since the switching notification is transmitted to the next master terminal device, the next master terminal device can know that a game progress unit has been completed and that it will become the master terminal device in the next game progress unit. If the switch notification is transmitted from the master terminal device to all of the other terminal devices, the terminal devices which received the notification can know that a game progress unit has been completed and which of the terminal devices will become the master terminal device in the next game progress unit.

Another embodiment of the present invention may be a competitive game system which can be played via a network, and which further comprises resumption notification means. The resumption notification means sends notification of the resumption of the game to client terminal devices via the network, by starting the next game progress unit from the terminal device which has received the game data and has become the new master terminal device.

The client terminal devices can be informed of the start of the next game progress unit, i.e., the resumption of the game, by receiving the resumption notification.

A fifth aspect of the present invention provides a competitive game system according to the first aspect, wherein a master experience time is stored which is the total length of time each of the terminal device is the master terminal device in the game. The length of the time that one terminal device is the master terminal device is measured every time a terminal device becomes the master terminal device, and the time measured is added to the master experience time of the terminal device. The terminal device having the shortest master experience time will be selected as the master terminal device for the next game progress unit to be started, based on the updated master experience time for each terminal device.

One method for determining the master terminal device is to determine the terminal device having the shortest master experience time. The master experience time of the terminal devices can be equalized, and a substantially equal opportunity to become the master terminal device can be given to each terminal device.

A sixth aspect of the present invention provides a competitive game system according to the first aspect, wherein the number of master experience units is stored, the number of master experience units being the total number of game progress units in which each of the terminal devices has been the master terminal device in the game. The number of master experience units of a terminal device is increased every time that terminal device becomes the master terminal device. Based on the updated number of master experience units of each terminal device, the terminal device having the smallest number of master experience units will be selected as the master terminal device in the game progress unit to be started.

One method for determining the next master terminal device is to determine the terminal device having the smallest number of master experience units. By allocating the number of master experience units equally to the terminal devices, a substantially equal opportunity to become the master terminal device can be provided to each terminal device.

A seventh aspect of the present invention provides a competitive game system according to the first aspect, wherein the players operating the terminal devices are notified whether each terminal device is the master terminal device.

For example, an output display or audio output that indicates to a player whether the terminal device that he or she is operating is the master terminal device or a client terminal device may be made from a monitor or a speaker connected to the terminal device. This allows the player to have a strategy for the game in accordance with the status of the terminal device. For example, if the terminal device is the master terminal device, the player can concentrate on offense, and if the terminal device is a client terminal device, the player can concentrate on defense.

An eighth aspect of the present invention provides a competitive game method which is executed by terminal devices that are connected via a network, wherein one of the terminal devices will become a master terminal device that manages the progress of the game and the remaining terminal devices will become client terminal devices. The method comprises the following steps:

executing a game that includes a plurality of game progress units by transmitting and receiving data to and from the master terminal device and the client terminal devices via the network;

allowing the master terminal device or each respective terminal device to select the master terminal device before one game progress unit is started;

allowing the master terminal device to switch the master terminal device after the one game progress unit is completed; and allowing the master terminal device not to accept data from the client terminal devices when switching the master terminal device.

The method is applied to the competitive game system according to the first aspect of the present invention, and has similar functions and effects as the first aspect.

A ninth aspect of the present invention provides a terminal device which can be connected to other terminal devices via a network. The device comprises the following means:

game executing means for executing a game that includes a plurality of game progress units by making the terminal device or one of the other terminal devices a master terminal device which manages the progress of the game, and transmitting and receiving data to and from the other terminal devices via the network;

master determination means for determining the master terminal device before an initial game progress unit is started, and for determining the master terminal device in the next game progress unit;

switching means for switching the master terminal device after a game progress unit is completed; and control means for controlling the master terminal device so that it will not accept data from client terminal devices when the master terminal device is being switched.

The terminal device is included in a competitive game system according to the first aspect of the present invention, and has similar functions and effects as the first aspect.

A tenth aspect of the present invention provides terminal program that causes a computer to function as a terminal device that is connected to other terminal devices via a network, the program comprising:

game executing means for executing a game that includes a plurality of game progress units by making the terminal device or one of the other terminal devices a master terminal device which manages the progress of the game, and transmitting and receiving data to and from the other terminal devices via the network;

master determination means for determining the master terminal device before an initial game progress unit is started, and for determining the master terminal device in the next game progress unit;

switching means for switching the master terminal device after a game progress unit is completed; and control means for controlling the master terminal device so that it will not accept data from client terminal devices when the master terminal device is being switched.

The program causes the computer to function as a terminal device according to the ninth aspect of the present invention, and has similar functions and effects as the ninth aspect.

The eleventh aspect of the present invention provides a competitive game method which is executed by terminal devices that are connected via a network. The method comprises the following steps:

executing a game that includes a plurality of game progress units by making the terminal device or one of the other terminal devices a master terminal device which manages the progress of the game, and transmitting and receiving data to and from other terminal devices via the network;

determining the master terminal device before an initial game progress unit is started, and when the terminal device is the master terminal device in a game progress unit, determining the master terminal device in the next game progress unit;

switching the master terminal device after the game progress unit has been completed; and controlling the master terminal device so that it will not accept data from the client terminal devices when the master terminal device is being switched.

The method is executed by the terminal device according to the ninth aspect of the present invention, and has similar functions and effects as the ninth aspect.

A twelfth aspect of the present invention provides a competitive game system which includes terminal devices that are connected via a network. The system:

makes one of the terminal devices a master terminal device which manages the progress of the game, makes the other terminal devices client terminal devices, and executes the game via a network; and selects the terminal device to become the master terminal device before the game is started, based on an experience value of each terminal device which is updated every time each respective terminal device is made the master terminal device or a client terminal device.

In this system, the master terminal device is not switched during a game. However, the terminal device which has the least experience as a master terminal device will be made the master terminal device based on the experience values. Thus, within a group of players who prefer a certain competitive game which is played via a network, a substantially equal opportunity to become the master terminal device can be given to each player in that group.

A thirteenth aspect of the present invention provides the competitive game system according to the twelfth aspect of the present invention, wherein:

the experience values are stored; and the stored experience values are updated in response to a terminal device being selected as the master terminal device.

Since the stored experience values are updated and stored again, the master terminal device can be determined based upon the latest experience values. The storage means may be one or more memory units in the terminal devices, a removable recording medium, one or more memory units in computers which can be connected to the terminal devices via networks, or the like.

Specifically, a terminal device can store its own experience value in a ROM or the like. Alternatively, a terminal device may read out the experience value stored in a recording medium such as a magnetic card and the like, and may temporarily store that value in RAM or the like. Further, it is also possible to provide a center server which stores the experience values of the terminal devices in a ROM or the like. In such case, the terminal devices may obtain the experience values from the center server and temporarily store the values in a RAM or the like. The terminal devices respectively determine which terminal device will become the master terminal device based on common rules. Alternatively, the center server may determine which terminal device will become the master terminal device.

A fourteenth aspect of the present invention provides a competitive game system according to the twelfth aspect, wherein a predetermined value is added to the experience values of the terminal devices in response to the selection of the master terminal device, and the latest experience values of the terminal devices are determined.

For example, the experience value calculation adds 1 point to the experience value of the terminal device which becomes the master terminal device, and adds −1 point to the experience value of the other terminal devices. The terminal device that is to become the master terminal device can be determined based on the magnitude of the experience values.

A fifteenth aspect of the present invention provides a competitive game system according to the twelfth aspect, wherein the experience value includes the number of times a game has been played and the number of times a terminal device has been the master terminal device. The system will select the master terminal device by calculating, for each terminal device, a ratio of the number of times a terminal device has been the master terminal device to the number of times a game has been played.

In another example, if a terminal device has been the master terminal device in a certain game, the number of times that terminal device has played the game and the number of times that terminal device has been the master terminal device in the game are incremented at the end of the game, and if a terminal device has not been the master terminal device in that game, only the number of times the game has been played is incremented at the end of the game. When the game is played again, the terminal device that will become the master terminal device is determined by the ratio: (number of times the terminal device has been the master terminal device)/(number of times the game has been played), and is obtained from the latest number of times the game has been played and the latest number of times the terminal device has been the master terminal device.

A sixteenth aspect of the present invention provides a competitive game method which is executed by terminal devices that are connected via a network. The method comprises the following steps:

making one of the terminal devices a master terminal device which manages the progress of the game, making the other terminal devices client terminal devices, and executing a game; and selecting the terminal device to become the master terminal device, based on an experience value of each terminal device which is updated every time each respective terminal device is made the master terminal device.

This method is executed by the game system according to the twelfth aspect of the present invention, and has similar functions and effects as the twelfth aspect.

BRIEF DESCRIPTION OF THE DRAWINGS

FIG. 6A shows an example of input data to be transmitted from the client terminal devices to the master terminal device.

FIG. 6B shows an example of output data to be transmitted from the master terminal device to the client terminal device.

FIG. 6C shows an example of game data to be transmitted to the next master terminal device when the master terminal device is switched.

FIG. 14 is an illustrative diagram showing an example of game data corresponding to the master determination rules shown in FIG. 12B.

PREFERRED EMBODIMENTS OF THE PRESENT INVENTION

Embodiment 1

Structure

Figure 1:
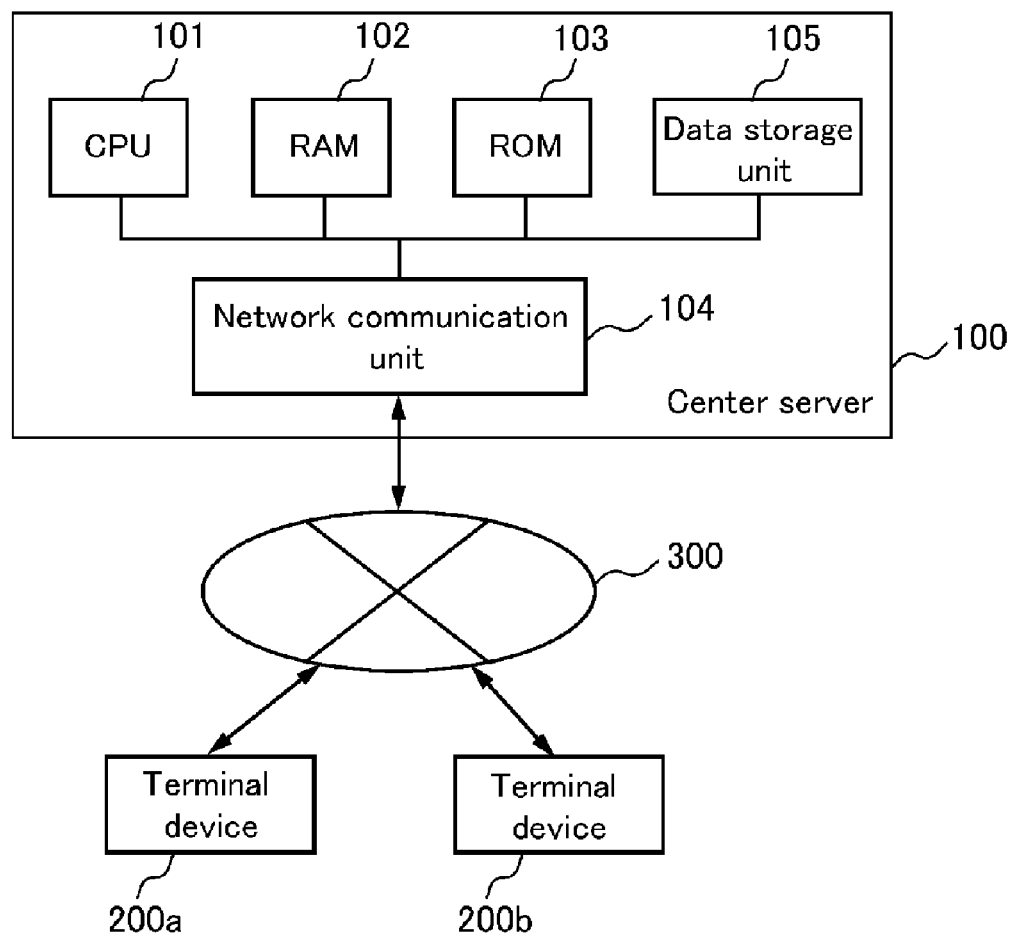
FIG. 1 is an illustrative diagram showing a schematic structure of a game system according to Embodiment 1.

FIG. 1 is an illustrative diagram showing a schematic structure of a game system according to Embodiment 1 of the present invention.

The game system includes a center server 100 and a plurality of terminal devices 200a and 200b. The terminal devices 200a and 200b are connected to the center server 100 via a network 300 such as the Internet.

The center server 100 stores personal data for each of the players and, upon a request from the terminal devices 200, transmits the personal data to a requester. The center server 100 includes following elements (a) through (e).

(a): CPU 101: Reads out and runs a control program stored in a ROM 103.

(b) RAM 102: Temporarily stores personal data and the like.

(c) ROM 103: Stores the control program, personal data, and the like.

(d) Network communication unit 104: Transmits and receives data to and from the terminal devices 200 via the network 300.

(e) Data storage unit 105: Stores personal data transmitted from the terminal devices 200.

Figure 2:
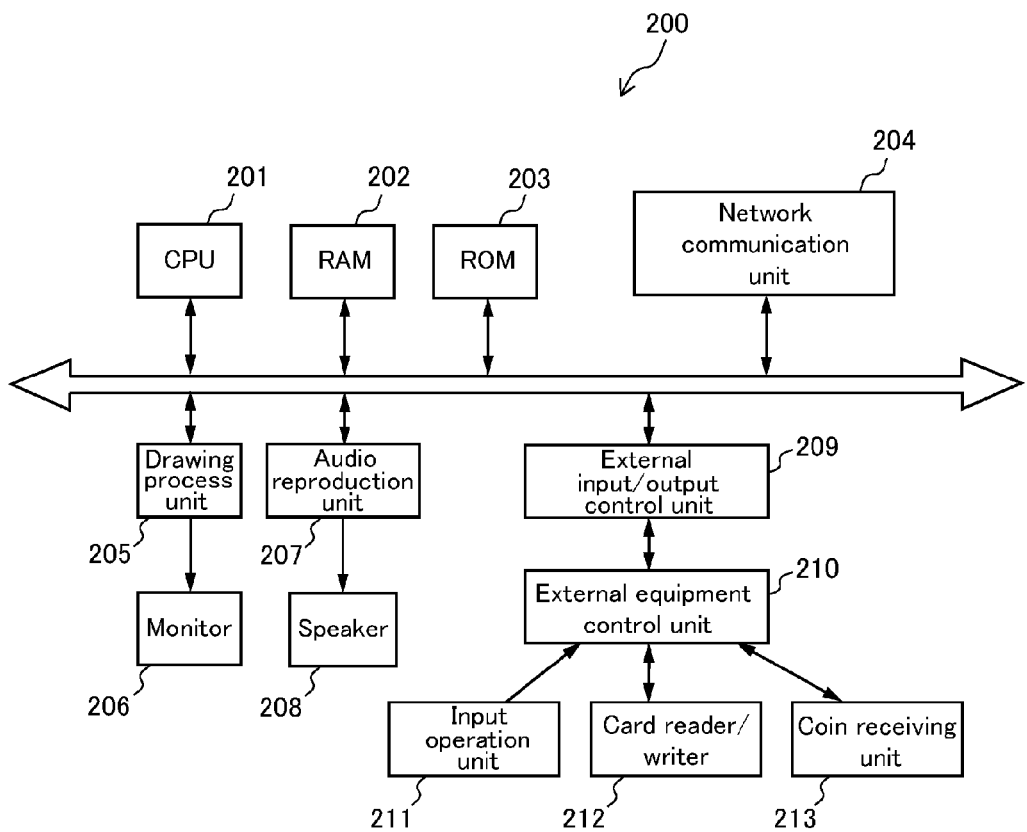
FIG. 2 is an illustrative diagram showing a structure of a terminal device 200.

A terminal device 200 plays a game with other terminal devices 200 via the network 300 based on personal data obtained from the center server 100. FIG. 2 shows the structure of the terminal device 200. The terminal device 200 includes the following elements (a) through (m).

(a) CPU 201: Runs a control program stored in ROM 203.

(b) RAM 202: Temporarily stores a variety of variables, parameters and the like.

(c) ROM 203: Stores a control program, a variety of parameters, and the like.

(d) Network communication unit 204: Transmits and receives data to and from the center server 100 and other terminal devices 200 via networks.

(e) Monitor 206: Displays game video.

(f) Drawing process unit 205: Generates video data to be displayed on the monitor 206.

(g) Speaker 208: Outputs sound while game is being played or a demonstration screen is being displayed.

(h) Audio reproduction unit 207: Generates sound data to be produced by the speaker 208.

(i) Input operation unit 211: Includes a joystick, operation buttons and/or the like, and receives commands from a player.

(j) Card reader/writer 212: Reads/writes data on a magnetic card that has been inserted therein.

(k) Coin receiving unit 213: Receives credit(s) by inserting coin(s) therein.

(l) External equipment control unit 210: Controls external equipment such as an operation unit, the card reader/writer 212, the coin receiving unit 213, and the like.

(m) External input/output control unit 209: Generates control signals to external equipment such as card reader/writer 212, the coin receiving unit 213, and the like. Also receives detection signals from the external equipment and sends those signals to the CPU 201.

With the terminal device 200 having the above-described structure, a game is played as follows. A player inserts his/her magnetic card into the card reader/writer 212, and inserts coin(s) into the coin receiving unit 213 at a terminal device 200. The terminal device 200 reads a player ID for identifying a player from the magnetic card inserted to the card reader/writer 212, and downloads personal data stored in the data storage unit 105 of the center server 100. Then, the terminal device 200 transmits its network address to the center server 100 and obtains the network address(es) of opponent(s). After it is decided which of the terminal devices 200 is to become the master terminal device, personal data of the client terminal devices(s) is transmitted to the master terminal device. The master terminal device starts the game based on personal data of all the terminal devices 200 which participate in the game (hereinafter, simply referred to as all the terminal devices 200). In order to allow all the terminal devices 200 to enjoy the opportunity to become the master terminal device during the course of the game, the master terminal device is basically switched when one game progress unit is finished.

Master switching (1) Flow of Switching

Figure 3:
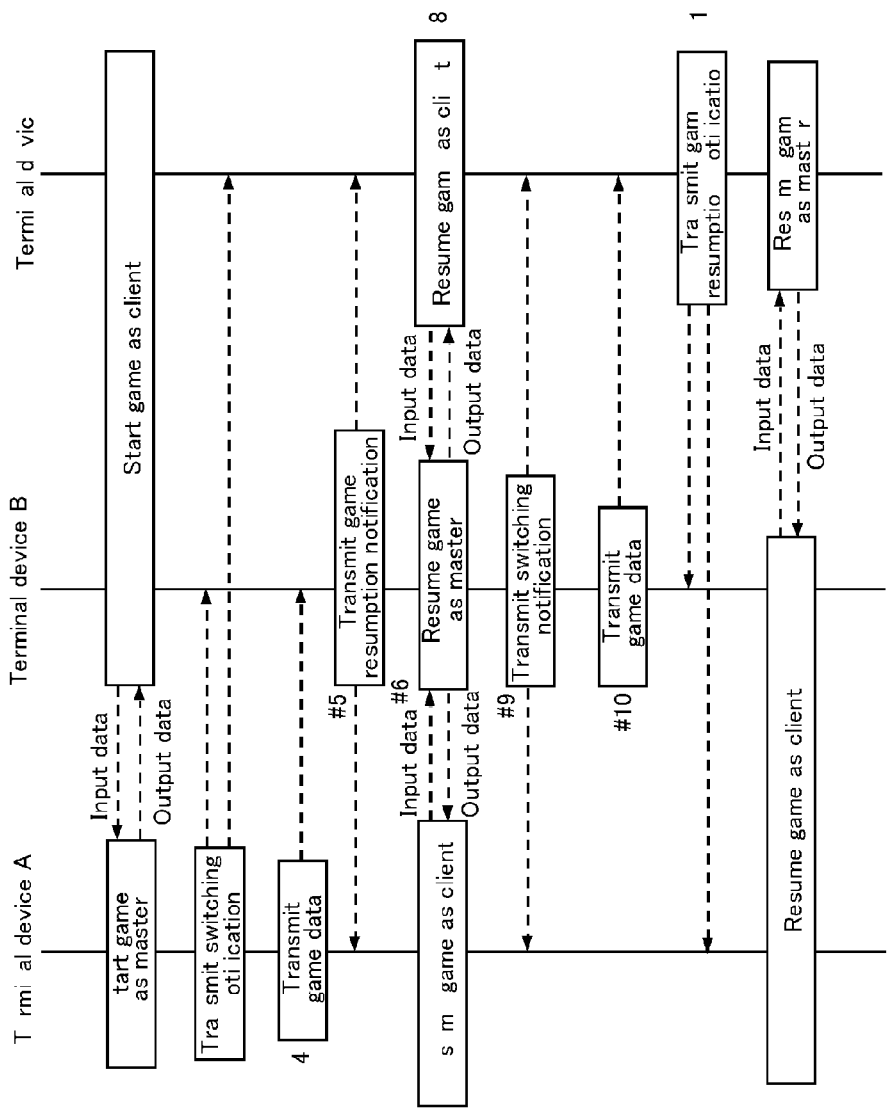
FIG. 3 is an illustrative diagram showing the switching of the master terminal device during the game.

FIG. 3 is an illustrative diagram showing the switching of the master terminal device during the game. In order to simplify the explanation, an example in which three terminal devices A, B and C play against each other will be described. The number of the terminal devices which participate the game may be any number equal to or higher than two.

The terminal devices A, B and C receive personal data from the center server 100, and each will respectively determine whether or not it will become the master terminal device in the initial game progress unit, based on master determination rules. In this example, the terminal device A is the initial master terminal device. After the initial master terminal device is determined, the game is started with the terminal device A as the master and the terminal devices B and C as the clients (#1, #2). Before the start of the game, the client terminal devices B and C transmit personal data to the master terminal device A. The personal data includes data used when a player repeatedly plays the game. For example, in a soccer game, personal data may include the name of the team, the names of players (characters), the outcomes in the past, and the like.

The master terminal device A determines the next master terminal device when the initial game progress unit is finished. The next master terminal device is determined based on the master determination rules. The terminal A transmits a switching notification which designates the next master terminal device by, for example, describing an IP address to the terminal devices B and C (#3). The switching notification is transmitted using a communication protocol which guarantees the certainty of the communication, TCP/IP, or the like. In this example, the switching notification serves as both end notification of the game progress unit and designation notification for next master terminal device. However, the notifications may be transmitted separately. The terminal device A further transmits game data which is necessary for continuing the game to the next master terminal device, which is the terminal device B in this example (#4). The game data includes personal data of all the terminal devices 200. While the game data is being transmitted, the master terminal device A disregards data even when it receives data from other terminal devices B and C. In order to alleviate the network load and the load on the master terminal device, it is preferable to halt transmission of commands input by the players from the client terminal devices B and C to the master terminal device A.

The terminal device B knows that it will become the master terminal device in the next game progress unit from the switching notification. The terminal device C knows that it will become a client terminal in the next game progress unit from the switching notification. When the terminal device B receives game data, it transmits a notification for resuming the game to the clients, which are other terminal devices A and C in this example (#5). The resumption notification is transmitted using a communication protocol which guarantees the certainty of the communication, TCP/IP, or the like. Then, the game is resumed with the terminal device B being the master and the terminal devices A and C being the clients to continue the game in the second game progress unit (#6, #7, and #8).

When the second game progress unit is finished, the master terminal device is switched again. The terminal device B which has been the master determines the next master terminal device when the game progress unit is finished, and transmits a switching notification describing the IP address thereof to the terminal devices A and C (#9). The terminal device B further transmits game data which is necessary for continuing the game to the next master terminal device, which is the terminal device C in this example (#10).

The terminal device C knows that it will become the master terminal device in the next game progress unit from the switching notification. When the terminal device C receives game data, it transmits a notification for resuming the game to the clients, which are the other terminal devices A and B in this example (#11). Then, the game is resumed with the terminal device C being the master and the terminal devices A and B being the clients to continue the game in the third progress unit of the game (#12 and #13).

As described above, in order to allow the terminal devices A, B, and C to operate as the master terminal device from the start to the end of the game, the master terminal device is switched. The switching of the master is performed such that all the terminal devices become the master terminal device at least once during the game. If the game has not yet been completed when all the terminal devices have become the master once, each terminal device can be the master again. The order for allocating the master to the terminal devices may be the same as that in the first cycle or may be different thereto.

(2) Game Progress Unit

One game includes a plurality of game progress units from start to end. It is preferable if the game progress units are set such that the master is switched when the terminal devices do not receive command inputs from the players in the progress of the game, since the multiplier effect of the game process and the master switching process can be achieved. The content of the settings of the game progress units is common to the terminal devices 200, and may be optionally stored in the terminal devices 200. For example, it is possible to store the settings of the game progress units in the ROM 203 or the like, and write the settings of the game progress units read out from the ROM 203 into a predetermined operational memory unit, from which it can be read out and used for calculation as necessary. Alternatively, it is possible to download the settings of the game progress units from the center server 100, and write the downloaded data into a predetermined operational memory unit, from which it can be read out and used for calculation as necessary. Further, it is also possible to integrate the settings of the game progress units into a program to be run by the terminal devices 200, and it can be read out by reading out the program from the ROM 203.

Figures 4A, 4B:
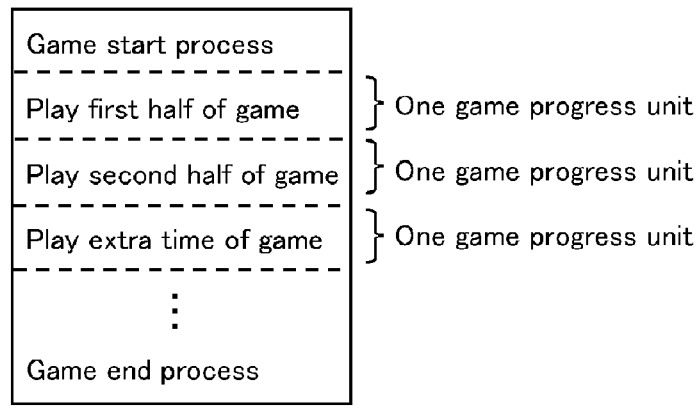
FIG. 4A is an illustrative diagram showing an example of how game progress units are set.
FIG. 4B is an illustrative diagram showing an example of master determination rules.

FIG. 4A shows an example of game progress units which are set such that the master is switched when the terminal devices do not receive the commands inputs from the players in the progress of the game. This figure shows an example of settings of the game progress units in a soccer game. The first half and the second half are respectively one game progress unit. When the game goes into extra time, the extra time becomes one game progress unit. Examples of such game progress units applied to other types of games may be the top and bottom of an inning in a baseball game, games in a tennis match, or rounds in a boxing game. In another example of a soccer game, by ignoring the commands received from the players when a foul is committed or at halftime, the time period between such events can be set as one game progress unit. Of course, the game may be segmented by a predetermined length of time T irrespective of the progress of the game, and one segment can be set as one game progress unit. The game progress units are not limited to such examples, and various types of game progress units can be set within one game.

The master terminal device is basically switched for every game progress unit. When one game progress unit is the first half or the second half, the master terminal device is switched for the first half and the second half. When one game progress unit has a predetermined length of time T, the master terminal device is switched every time the time T has elapsed. When one game progress unit is divided by an automatic progress time period, which is a time period when the commands input from the players are not received, the master terminal device is switched every time the automatic progress time period occurs. However, as will be described later, there may be cases where the same terminal device is the master terminal device for a plurality of game progress units (see Embodiment 2 which will be described later).

(3) Master Determination Rules

FIG. 4B is an illustrative diagram showing an example of master determination rules for determining which of the terminal devices becomes the master terminal device before the game progress unit is started. The master determination rules are common to the terminal devices 200, and may be or may not be stored in the terminal devices 200. For example, it is possible to store the master determination rules in the ROM 203 or the like, and write the master determination rules read out from the ROM 203 into a predetermined operational memory unit, from which it can be read out used for calculation as necessary. Alternatively, it is possible to download the master determination rules from the center server 100, and write the downloaded data into a predetermined operational memory unit, from which it can be read and used for calculation as necessary. Further, it is also possible to integrate the master determination rules into a program to be run by the terminal devices 200, and they can be read out by reading out the program.

The content of the master determination rules is arbitrary. In this example, the terminal devices 200 become the master in descending order of the IP addresses (Condition 1). The master is switched when a game progress unit ends (Condition 2). If the game does not come to an end even when all the terminal devices have become the master once, the terminal devices 200 can become the master again (Condition 3). Of course, the master determination rules are not limited to this example.

Figure 5:
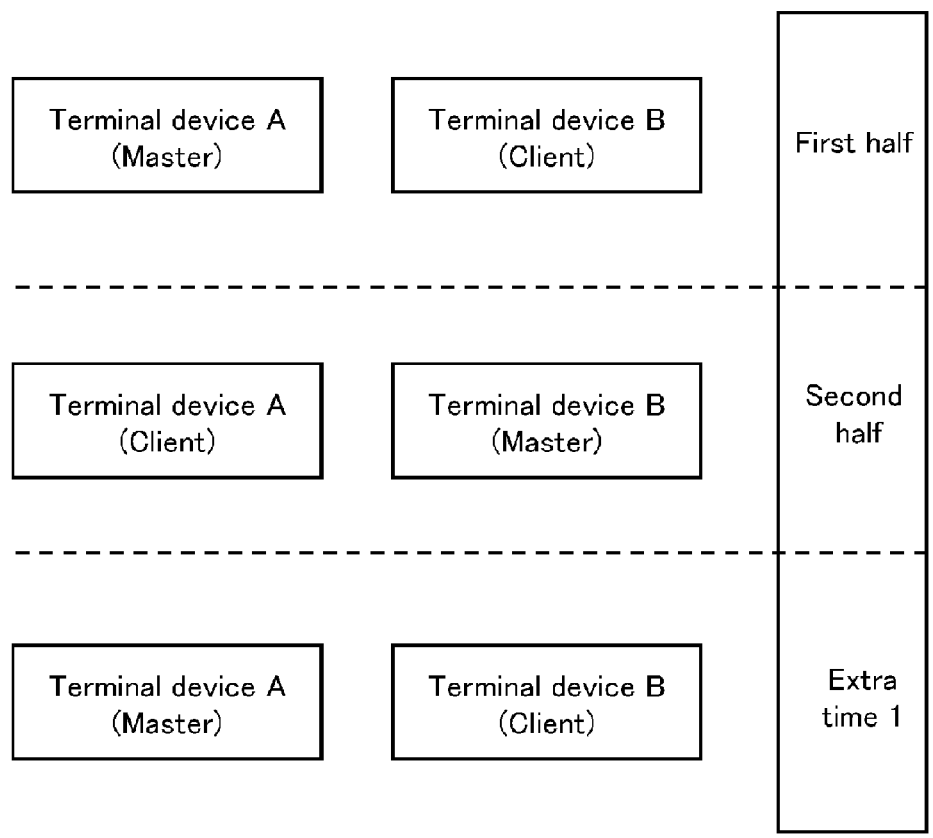
FIG. 5 shows an example of the game progress units set in FIG. 4A and an example of how the master determination rules in FIG. 4B are applied.

FIG. 5 is an example of the application of the settings of the game progress units shown in FIG. 4A and the master determination rules shown in FIG. 4B. In order to simplify the explanation, a soccer game is played by terminal devices A and B in this example. The IP address of the terminal device A is larger than that of the terminal device B. Based on Condition 1, the terminal device A is the master in the first game progress unit "first half". Based on Condition 2, the master is switched when the "first half" is finished. The terminal device B has the IP address which is next largest after the terminal device A. Thus, the terminal device B becomes the master in the "second half" based on Condition 1. Based on Condition 2, the master is switched after the "second half". After all the terminal devices A and B which participate the game become the master at least once, the terminal devices A and B can be the master again based on Condition 3. However, based on Condition 1, the terminal device A becomes the master in the next game progress unit "extra time 1". As described above, the master terminal device is switched during the game based on the setting of the game progress units and the master determination rules.

(4) Input Data, Output Data, and Game Data

FIG. 6A shows an example of input data to be transmitted from the client terminal devices to the master terminal device. In order to simplify the explanation, a soccer game will be described below as an example. The input data is data indicating the content of the commands input by the players at the client terminal devices. The client terminal devices transmit input data to the master terminal device every time there is an command input. This figure shows the input data representing which of the up, down, left and right levers is operated and which of five buttons is pressed.

FIG. 6B shows an example of output data to be transmitted from the master terminal device to the client terminal. The output data is frame data for displaying a game screen at the client terminal devices and audio data for producing sound.

The master terminal device transmits a variety of output data to the client terminal devices in time sense in accordance with the type of the data. For example, frame data is transmitted every ¹/₆₀ seconds.

FIG. 6C shows an example of game data to be transmitted to the next master terminal device when the master terminal device is switched. The game data includes the history of the game and is necessary for continuing the game. The game data may be, for example, the remaining physical strength of the players (characters), the number of yellow cards and red cards of the players (characters), the number of shots so far, the number of fouls so far, the points, the name of the teams, player (character) data and the like. The game data is transmitted using a communication protocol which guarantees the certainty of the communication, TCP/IP, or the like.

Process at Terminal Devices

Next, the process performed by the terminal devices 200 will be described in more detail. In order to simplify the explanation, the process based on game settings and the master determination rules as shown in FIG. 4 will be described below.

(1) Main Routine

Figure 7:
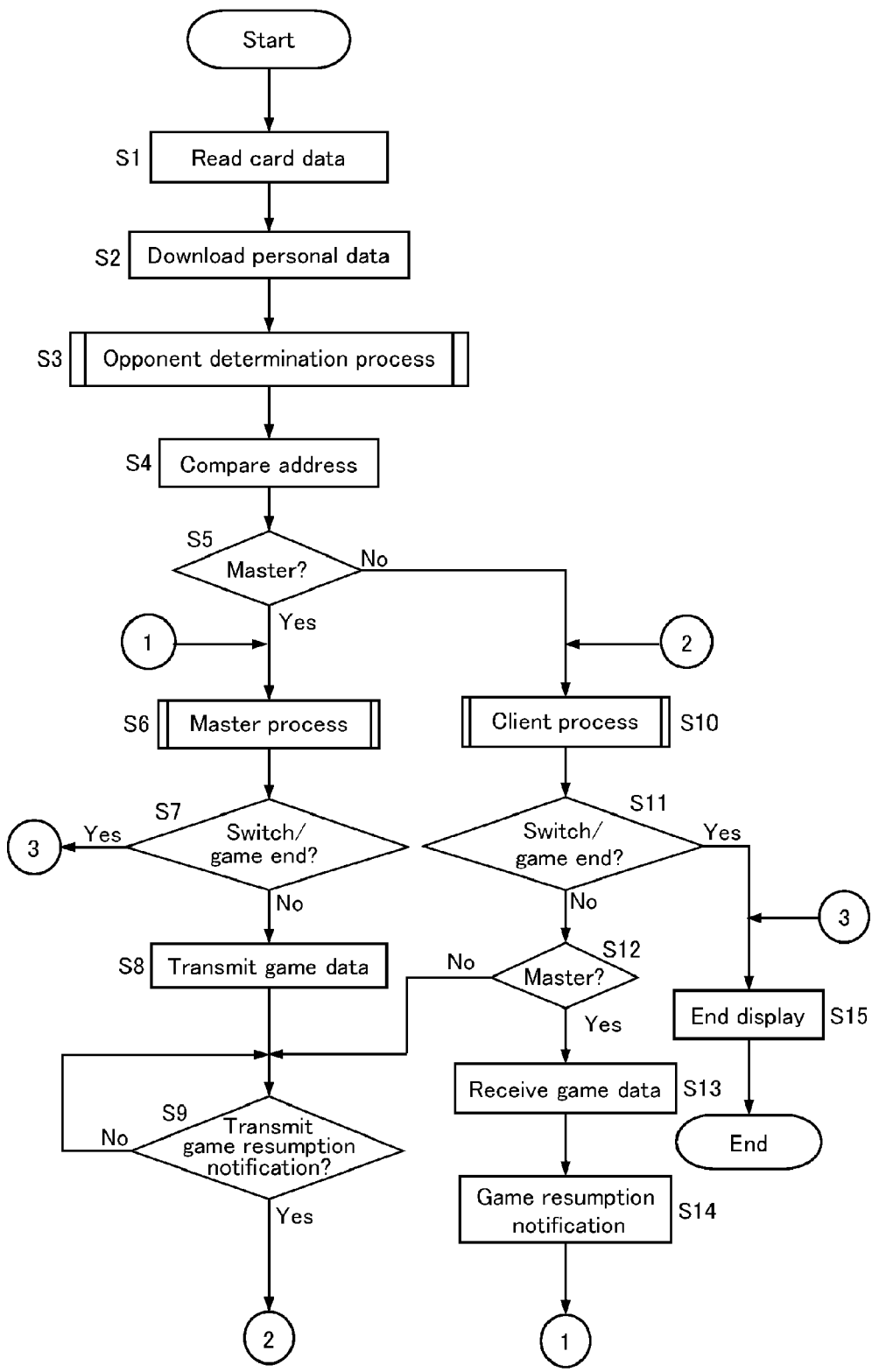
FIG. 7 is a flow diagram showing an example of the flow of the main routine performed by the terminal device 200.

FIG. 7 is a flow diagram showing an example of a flow of the main routine performed by the CPU 201 of the terminal device 200. The terminal device 200 plays the game with a master process if it is the master, and plays the game with a client process if it is a client.

Step S1: The CPU 201 obtains a player ID which is read by the card reader/writer 212.

Step S2: The CPU 201 transmits the player ID to the center server 100, and downloads personal data in accordance with the player ID.

Step S3: The CPU 201 performs an opponent determination process, and obtains IP address(es) of the opponent(s) which it plays against via the network 300.

Step S4: The CPU 201 compares its IP address with that of the opponent(s).

Step S5: The CPU 201 determines whether it becomes the master or not in the first game progress unit based on the comparison result (master determination means).

Step S6: The CPU 201 performs the master process when it becomes the master in the game progress unit to be played (game playing means). In this process, the CPU 201 plays the game as the master in one game progress unit, and determines the next master when one game progress unit is finished, and transmits the switching notification or transmits the game end notification.

Steps S7 and S8: The CPU 201 determines whether the master is to be switched, i.e., it is an end of the game progress unit, or it is the end of the game (S7). When the master is switched (S7), the game data is transmitted to the master terminal device in the next game progress unit (switching means) (S8). While the game data is being transmitted, the commands data from the client terminal devices is disregarded even when it is received (control means).

Step S9: Then, the CPU 201 waits for the game resumption notification from the master terminal device in the next game progress unit. When it receives the notification, it proceeds to step S10. Specifically, it plays a game in the next game progress unit as a client.

Step S10: The CPU 201 plays the game with a client process (game playing means) when it is determined to become a client before the game is started (S5) or it is not designated as next master after the game progress unit is finished (S12 which will be described later). Specifically, it performs a process to transmit the input data to the master terminal device and control the output based on the output data received from the master terminal device.

Step S11: The CPU 201 proceeds to step S12 when it receives the switching notification from the master terminal device. When it receives the game end notification, it proceeds to step S15.

Step S12: The CPU 201 determines whether or not it becomes the master in the next game progress unit based on the switching notification. When it is determined that it becomes the master, it proceeds to step S13 (master determination means). If it is determined that it becomes a client, it proceeds to step S9 which has been described above, and waits for the resumption notification before it performs the client process (S9 and S10).

Steps S13 and S14: The CPU 201 receives game data from the former master terminal device when it is designated as the next master by the switching notification (S13), and transmits the game resumption notification to other terminal devices (resumption notification means) (S14). Then, it returns to step S6 and performs the master process (S6).

Step S15: The CPU 201 displays the game outcomes, uploads the personal data and the like when the game is finished to complete the process.

(2) Opponent Determination Process

Figure 8:
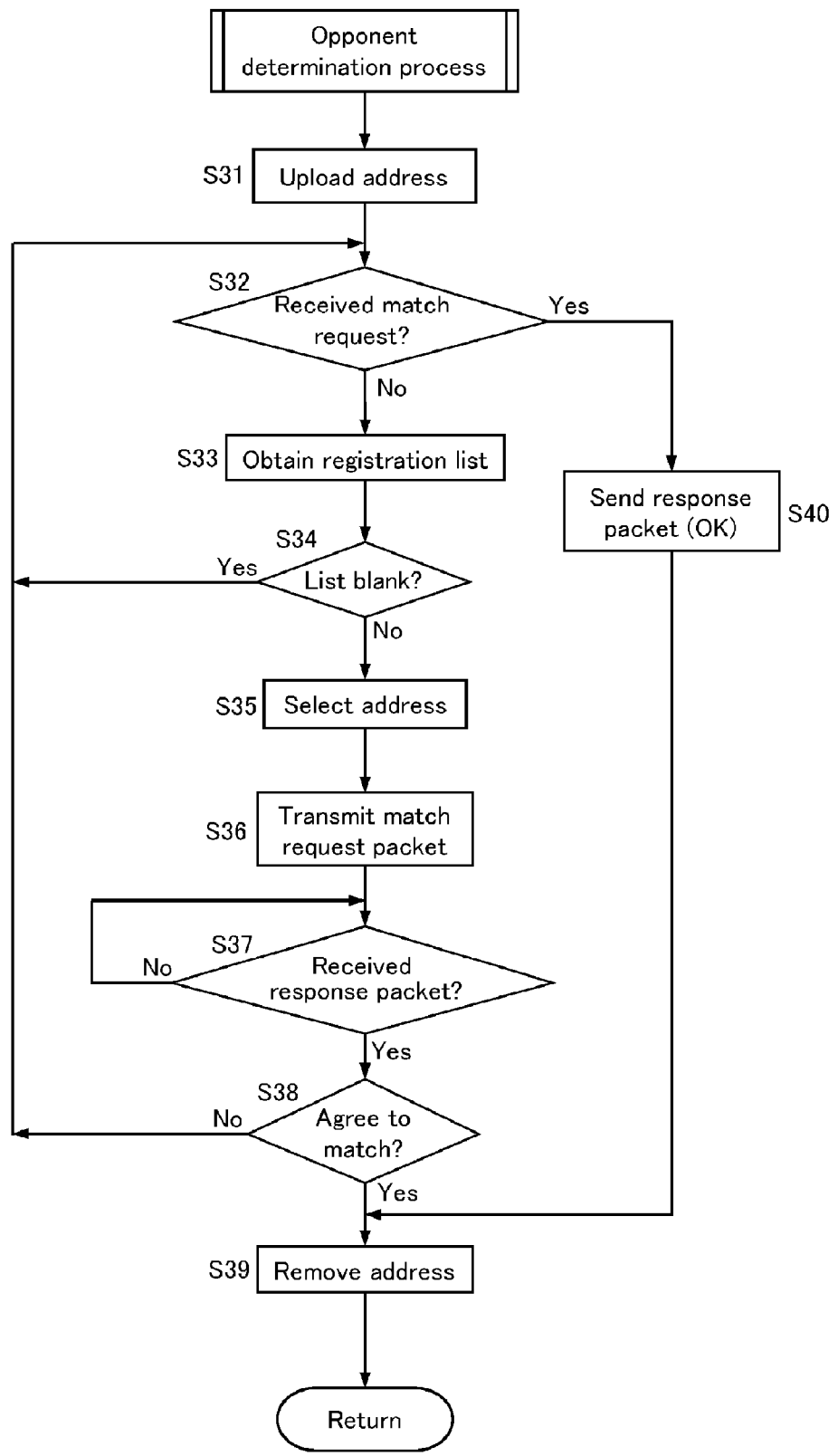
FIG. 8 is a flow diagram showing an example of the flow of an opponent determination process.

FIG. 8 is a flow diagram showing an example of a flow of an opponent determination process performed at step S3 in the main routine. In this process, the CPU 201 obtains an IP address of the opponent terminal device(s) against which it plays via the center server 100.

Step S31: The CPU 201 transmits its IP address to the center server 100 and requests the registration of the IP address to a registration list stored in the RAM 202 of the center server 100.

Steps S32 and S33: The CPU 201 determines whether or not it has received a match request from other terminal devices (S32). If it is not, it obtains a registration list from the center server 100 (S33). If it has received a match request it proceeds to step S40 which will be described later.

Steps S34 and S35: The CPU 201 determines whether or not an IP address other than its address is registered on the registration list (S34). If it is determined "Yes", it selects one of the IP addresses (S35).

Step S36: The CPU 201 transmits a match request packet describing a match request command to the selected IP address.

Steps S37 through S39: The CPU 201 waits for reception of a response packet to the transmitted match request packet (S37). When it receives a response which agrees to match (S38), it requests the center server 100 to remove its IP address from the registration list (S39). When the match is refused (S38), the CPU 201 returns to Step S32, and repeats the above-described process.

Step S40: When the CPU 201 receives a match request after it has registered its IP address to the registration list (S32), it transmits a response packet to a requester to agree to match (S40), and requires removing its IP address from the registration list (S39).

(3) Master Process

Figure 9:
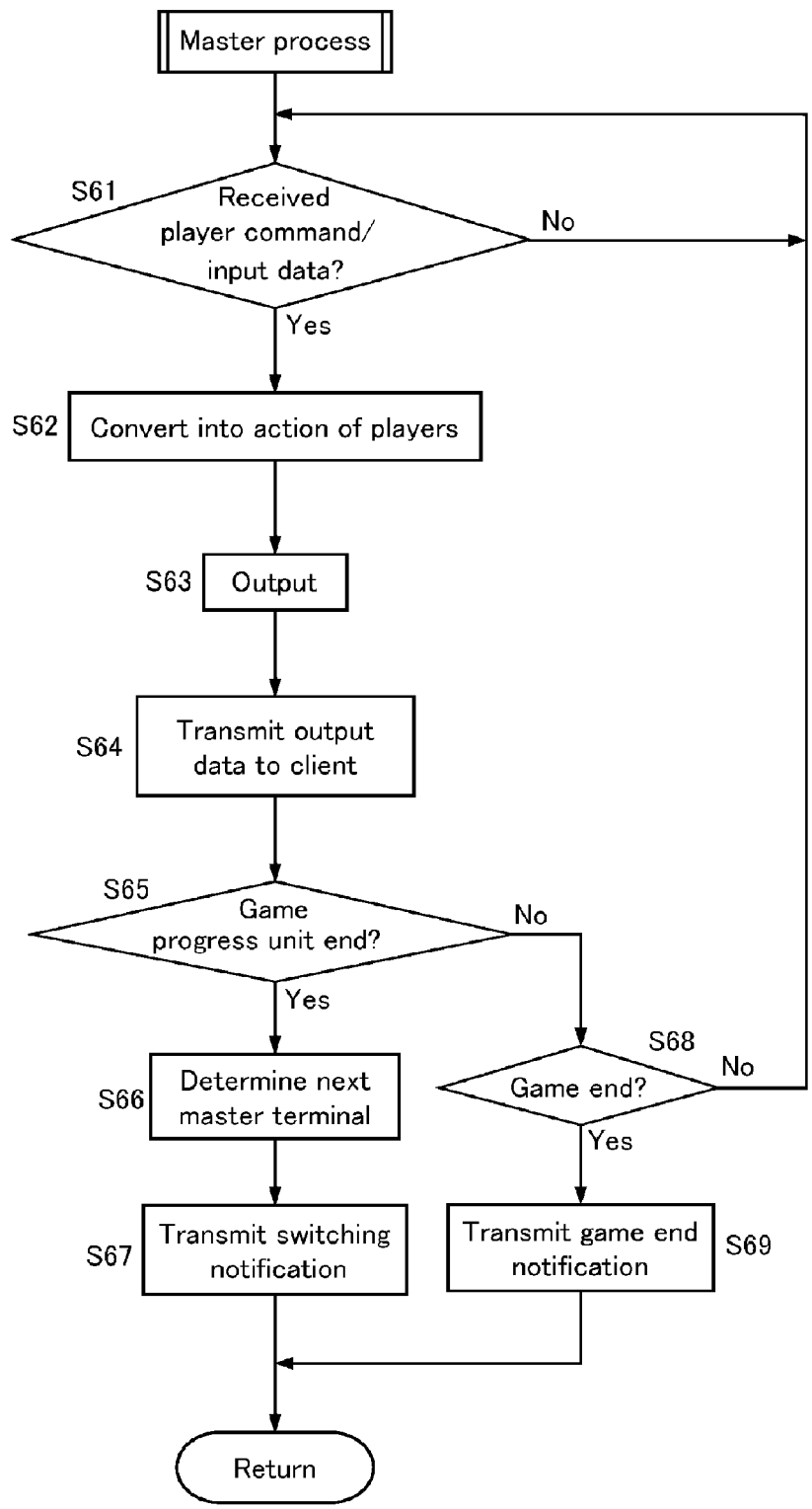
FIG. 9 is a flow diagram showing an example of the flow of a master process.

FIG. 9 is a flow diagram showing an example of a flow of a master process performed by the CPU 201 at step S6 in the main routine. In this process, the CPU 201 plays the game as the master until the game progress unit is finished.

Step S61: The CPU 201 waits for an commands input by the player at the terminal or reception of input data from client terminal(s). If there is any, it proceeds to step S62.

Step S62: The CPU 201 converts the input data into the action of the characters such as players.

Step S63: The CPU 201 transmits output data to its drawing process unit 205 and audio reproduction unit 207, and controls the output.

Step S64: The CPU 201 transmits output data to the client terminal(s) via the network 300.

Steps S65 through S67: The CPU 201 determines whether or not the game progress unit comes to an end based on the setting of the game progress units (S65). When the game progress unit is finished (S65), the CPU 201 determines the master terminal device in the next game progress unit based on the master determination rules (master determination means) (S66). Then, the CPU 201 transmits the switching notification including the IP address of the next master terminal device and the like to all the other terminal devices 200 (switching means) (S67).

Steps S68 through S69: The CPU 201 determines whether or not the end of the game progress unit is also the end of the game. If it is determined "Yes", it transmits the game end notification to all the other terminal devices 200 (S69). The game end notification includes data necessary for the client terminal devices to perform the game end process. If it is determined that the game has not come to an end, the CPU 200 again returns to step S61, and repeats the above-described process until the end of the game progress unit.

(4) Client Process

Figure 10:
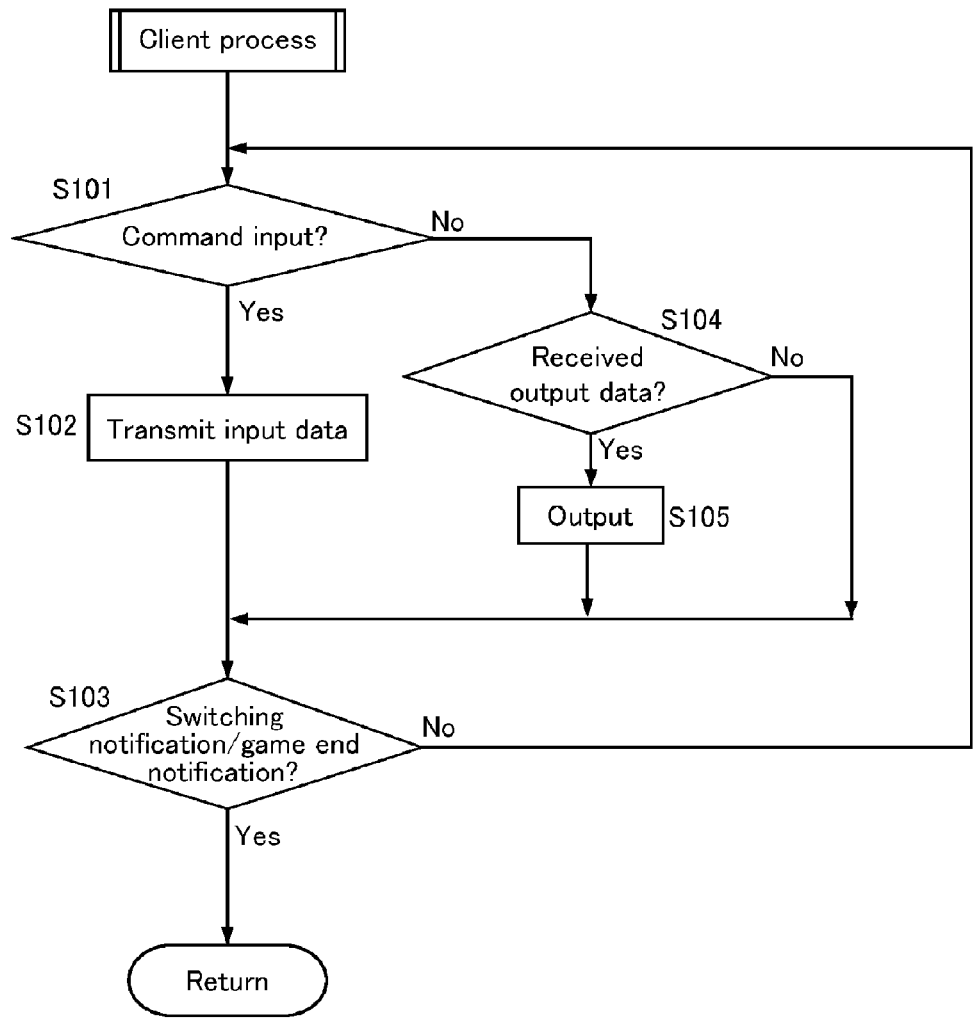
FIG. 10 is a flow diagram showing an example of the flow of a client process.

FIG. 10 is a flow diagram showing an example of the client process performed by the CPU 201 at step S10 in the main routine. In this process, the CPU 201 plays the game as a client.

Step S101 and S102: The CPU 201 waits for an commands input from the player (S101), and transmits the input data to the master terminal device every time it receives the commands input (S102).

Step S103: The CPU 201 determines whether or not it has received the switching notification or the game end notification from the master terminal device. If it is determined it has received one, it returns to the main routine.

Steps S104 and S105: The CPU 201 waits for reception of output data from the master terminal device (S104), and transmits the received data to the drawing process unit 205 and/or audio reproduction unit 207 to control screen output and audio output (S105).

[Process of the Center Server]

Figure 11:
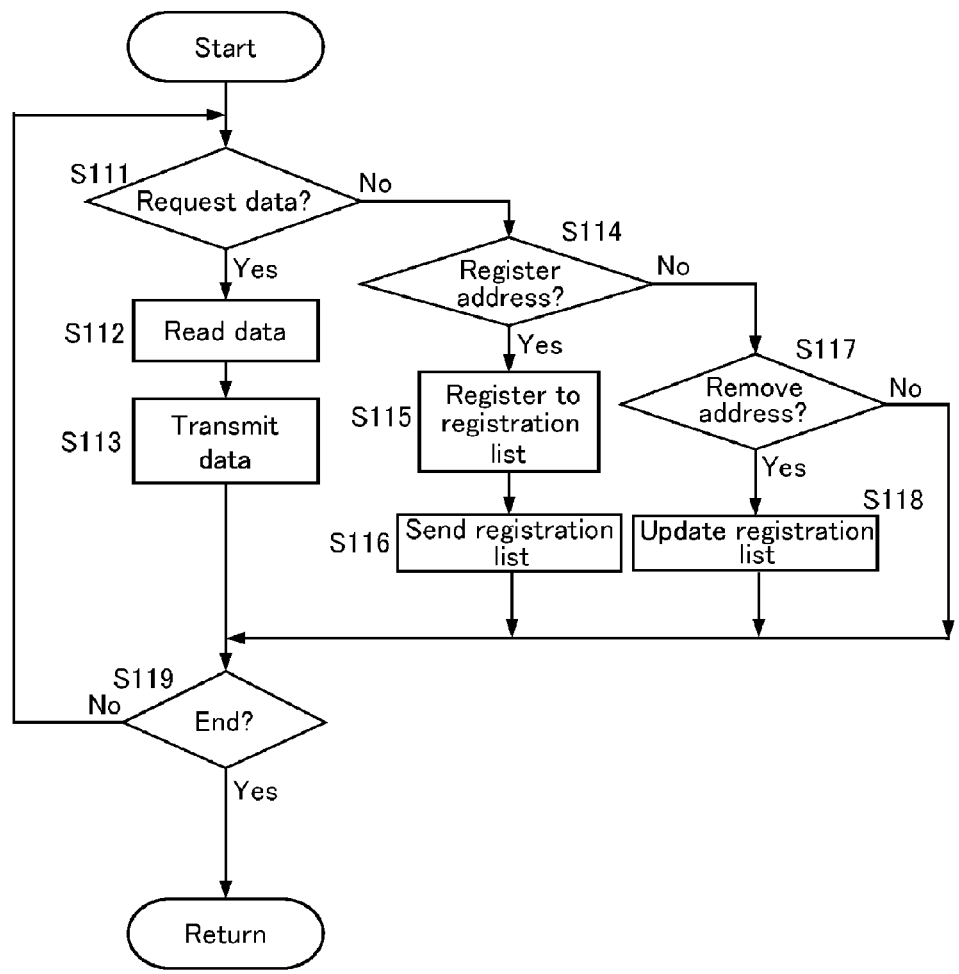
FIG. 11 is a flow diagram showing an example of the flow of the process performed by a center server 100.

FIG. 11 is a flow diagram showing an example of a flow of a process performed by the center server 100. The CPU 101 of the center server 100 performs a process to transmit personal data to the terminal devices 200 (S111 through S113), registration to the registration list (S114 through S116), and cancellation from the registration list (S117 and S118).

Steps S111 through S113: When the CPU 101 receives a request for personal data from any of the terminal devices 200 (S111), it reads out personal data requested by the ROM 103 (S112) and transmits it to the requester (S113). The personal data is stored in the ROM 103 in association with the player ID.

Steps S114 through S116: When the CPU 101 receives a registration request of an IP address to the registration list from any of the terminal devices 200 (S114), it registers the IP address of the terminal to the registration list (S115), and transmits the registration list to the requester (S116).

Steps S117 and S118: When the CPU 101 receives a cancellation request for an IP address on the registration list from any of the terminal devices 200 (S117), it removes the IP address from the registration list (S118). In order to secure that only the IP addresses of the terminal devices which do not have opponents yet are on the registration list, the IP address of the terminal device which already has opponent(s) is removed from the registration list.

Step S119: The CPU 101 repeats the above-described process until the power of the center server 100 is turned off, for example.

By switching the master terminal device for every game progress unit, the players of the terminal devices which participate the game enjoy the substantially equal opportunity to become the master. Therefore, it is possible to prevent a certain player gaining an advantage or being disadvantaged due to a gap in response of the master terminal device and client terminal devices even when a highly active type game is played via a network. As a result, unfairness among the players during network play of the highly active type games can be eliminated, and the network play of such types of games can be realized.

Embodiment 2

An example in which the master terminal device is not switched for every game progress unit, and one terminal device 200 remains the master terminal device will be described. The structures of the game system and the terminal devices 200 are as shown in FIGS. 1 and 2.

Figures 12A, 12B:
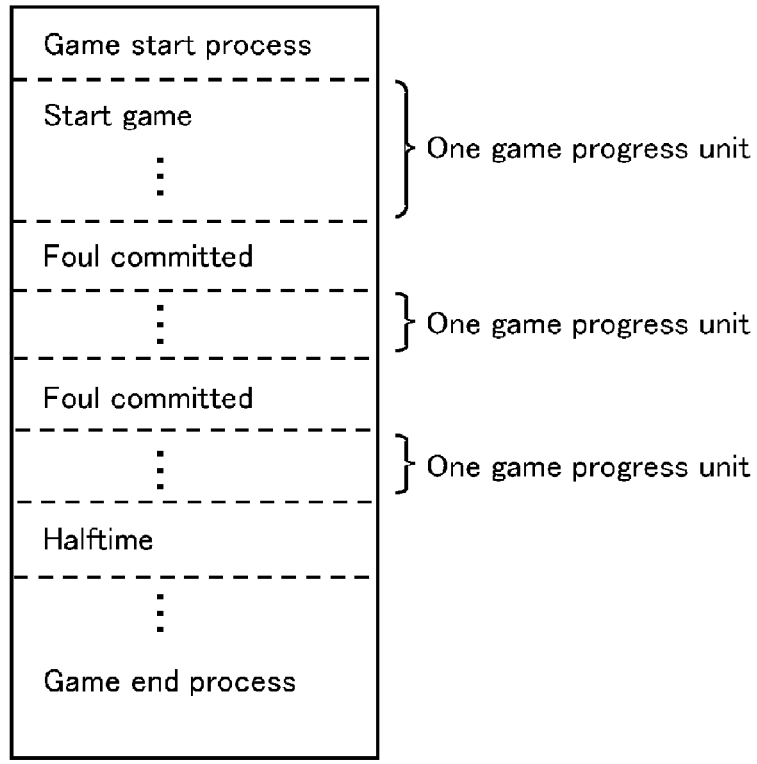
FIG. 12A is an illustrative diagram showing an example of how the game progress units are set according to Embodiment 2.
FIG. 12B is an illustrative diagram showing an example of the master determination rules according to Embodiment 2.

FIG. 12A is an illustrative diagram showing an example of the setting content of the game progress units according to Embodiment 2. In this example, one game progress unit refers to a time period defined by the time periods during which commands input by the players are not accepted. For example, in soccer games, commands input from players are not accepted during a predetermined period after a foul was committed, or during halftime. A time period defined by such time periods can be set as one game progress unit. The game data is transmitted and received and the master is switched during the time period in which commands inputs from the players are not accepted.

FIG. 12B is an illustrative diagram showing an example of the master determination rules according to Embodiment 2. According to these rules, all the terminal devices become the master at least once in the order of IP address (Conditions 1 and 2). Then, the terminal device which has the shortest master experience time when the game progress unit finishes becomes the next master (Condition 3). The master experience time is the total number of hours to be the master. This is temporarily stored in the RAM 202 or the like of the master terminal device (time storage means) and transmitted to the next master terminal device as a part of the game data.

FIG. 13 is an illustrative diagram showing an example of application of the settings of the game progress unit of FIG. 12A and the master determination rules of FIG. 12B. In order to simplify the explanation, it is assumed that the terminal devices A, B and C play against each other and the relationship in magnitude of the IP addresses is terminal device A>terminal device B>terminal device C.

Figure 13A:
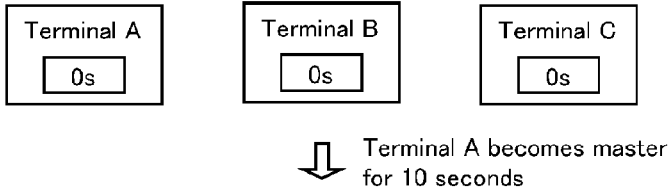
FIG. 13 is an illustrative diagram showing an example of how the settings of the game progress units and the master determination rules of FIG. 12 are applied.
Figure 13B:
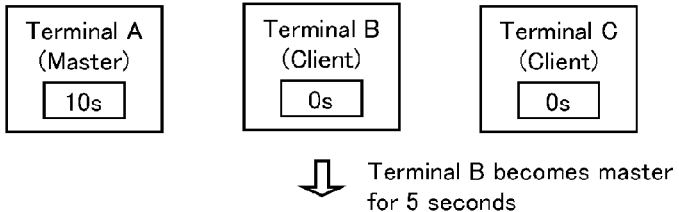
Figure 13C:
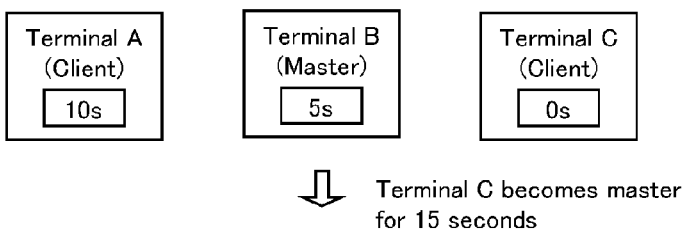
Figure 13D:
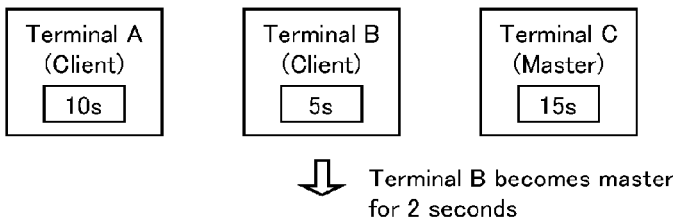
Figure 13E:
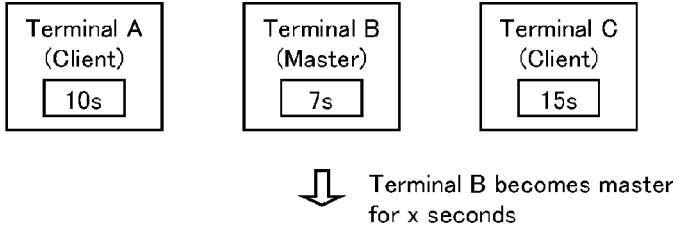
Figure 13F:
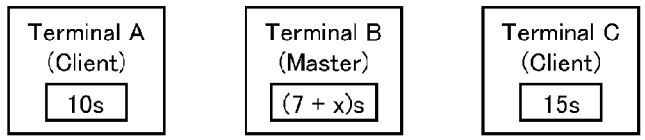

At first, the terminal devices A, B, and C become the master terminal device in descending order of the IP addresses (FIG. 13A through FIG. 13D). However, the time period during which each of the terminal devices is the master varies. After one cycle, the terminal device B which has shortest master experience time at the moment (5 seconds) becomes the master in the next game process unit (FIG. 13E). In this example, the terminal device B still has the shortest master experience period (7 seconds) compared to the terminal device A (10 seconds) and the terminal device C (15 seconds) even after it has become the master terminal device twice. Thus, it becomes the master terminal device again (FIG. 13F). As described above, the next master terminal device is determined based on the master experience time. In this way, the length of the time the terminal devices experience the master can be made equal to further guarantee the fairness among the terminal devices.

FIG. 14 is an illustrative diagram showing an example of the game data corresponding to the master determination rules shown in FIG. 12B. It is necessary to further add the master experience time of the terminal devices to the game data in Embodiment 1 and transmits to the terminal device to become the new master.

Figure 15:
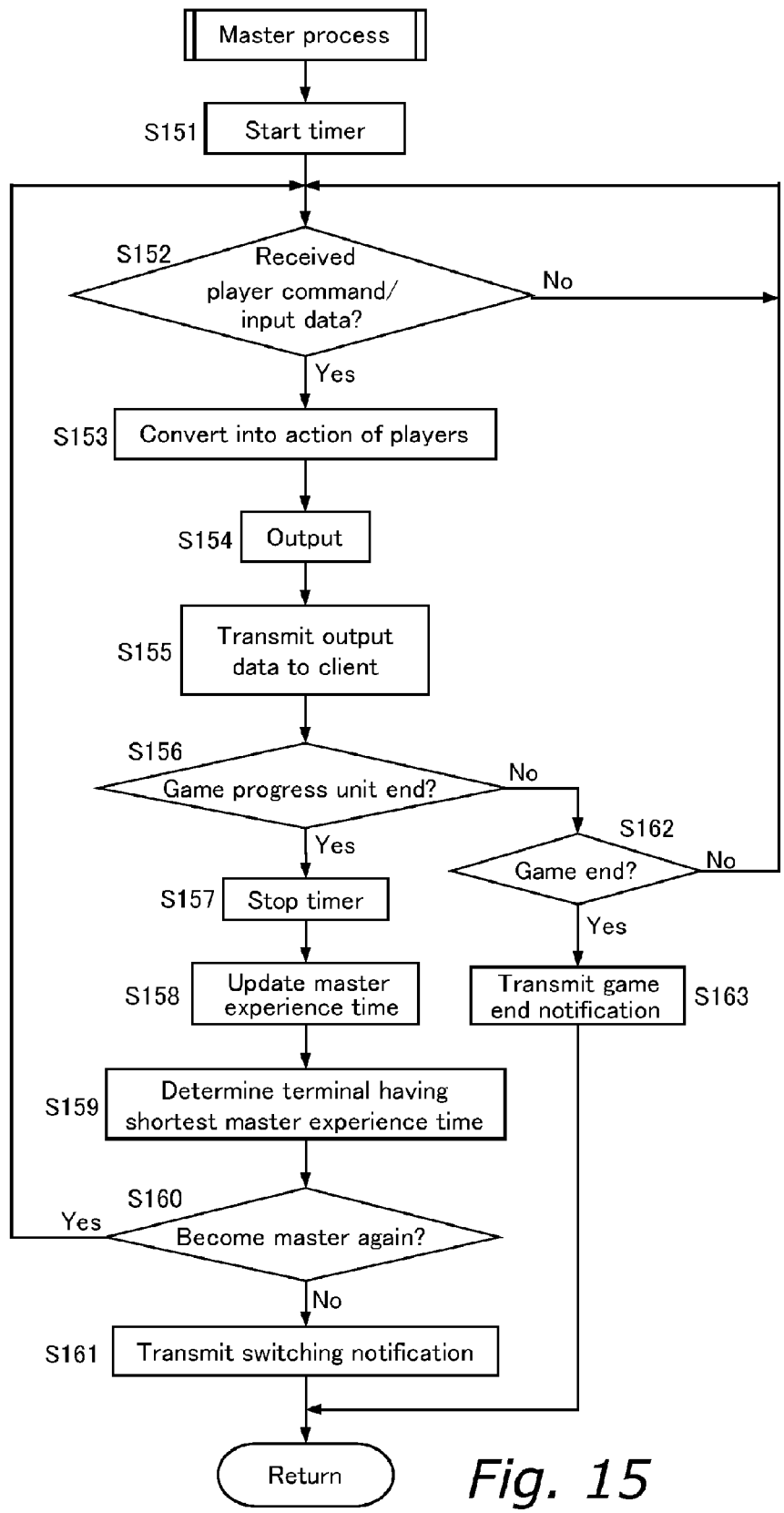
FIG. 15 is a flow diagram showing an example of THE flow of the master process corresponding to the master determination rules shown in FIG. 12B.

FIG. 15 is a flow diagram showing an example of a flow of the master process corresponding to the master determination rules shown in FIG. 12B. In this process, the CPU 201 plays the game as the master until the game progress unit ends.

Step S151: The CPU 201 starts the timer and starts to measure the time period during which it is the master in the game progress unit to be started (time calculation means).

Step S152: The CPU 201 waits for an commands input by the player at the terminal or reception of the input data from a client terminal. If there is any, it proceeds to step S153.

Step S153: The CPU 201 converts the input data into action of the character such as players.

Step S154: The CPU 201 transmits the output data to its drawing process unit 205 and/or audio reproduction unit 207 and controls the output.

Step S155: The CPU 201 transmits the output data to the client terminal devices via the network 300.

Step S156: The CPU 201 determines whether the game progress unit is finished or not with reference to the settings of the game progress units. When the game progress unit is finished (S156), the timer is stopped (S157) and adds the measured period to the master experience time at the time to calculate its latest master experience time (time calculation means) (S158).

Step S159: Then, the CPU 201 determines the master terminal device in the next game progress unit based on the master determination rules (S159). Specifically, the terminal having the shortest master experience time among all the terminal devices 200 participating in the game is determined to be the next master terminal device.

Step S160: The CPU 201 determines whether it again becomes the master terminal device or not. When it is determined "Yes", it returns to step S151 and continues the next game progress unit as the master terminal device. When it is determined "No", it transmits the switching notification including the IP address of the next master terminal device and the like to other terminal devices 200 (S161).

Steps 162-S163: The CPU 201 determines whether the game itself also finishes at the end of the game progress unit. When it is determined "Yes", it transmits the game end notification to all the other terminal devices 200 (S162). When it is determined "No", it returns to step S151 and repeats the above-described process until the game progress unit is finished.

The flow of the process performed by the terminal devices 200 is same as that in Embodiment 1 except for the master process.

The next master terminal device is determined such that the master experience time is made equal. Thus, the fairness among the terminal devices playing against each other can be further guaranteed.

Embodiment 3

In Embodiments 1 and 2, the opportunities to become the master are given equally to the terminal devices within one game by switching the master during the game. However, if the players try to play the game several times in the game system as shown in FIG. 1, instead of switching the master during the game, there will be a balance between the opportunity to become the master and the opportunity to become clients.

The method of determining the master of the game may be as follow. When the terminal devices A, B and C are about to start the game, it is possible to determine which of the terminal devices become the master based on the number of times the terminal devices have become the master (referred to as a master number) and the number of times they have become the clients (referred to as a client number). More specifically, the terminal device CPU 201 calculates its master experience value by adding +1 when it becomes the master and adding −1 when it becomes the client. The initial value of the master experience value is zero. If the game is played one-to-one, the closer the master experience value of the terminal device is to zero, the number of times it becomes the master and the number of times it becomes the client strikes a balance. Before the game is started, the master experience value(s) of the opponent(s) is obtained from the center server 100 or the opponent(s), and the terminal device with the smallest maser experience value is determined to be the master. The master experience value can be included in the personal data, and may be recorded on the magnetic card or may be stored in the ROM 103 of the center server 100 or the like. The center server 100 may determine the master.

As another master determination method, there is a method of determining the master based on the percentage of the each of the terminal devices becoming the master in the games which have been played so far. For example, the game number, which is the total number of times the terminal devices played the games, and the mater time, which is the number of times the terminal devices become the master may be used as the master experience values. The CPU 201 of the terminal device calculates the percentage of the terminal devices which participate the games based on its master experience value and that of opponent(s) with the following formula, and determined the terminal device having the lowest master percentage as the master. When the game is played one-to-one, the closer the master percentage is to 0.5, it strikes a balance between the number of times it becomes the master and the number of times it become the client.

(Master percentage)=(Master number)/(game number)

Process of the terminal devices

Hereinafter, the process of the terminal devices will be explained with reference to the example in which the terminal device determines the master. In order to simplify the explanation, an example in which the terminal devices 200 transmit/receive their master experience values and each of the terminal devices 200 determines the terminal device to become the master will be explained. The process of the center server 100 is same as that shown in FIG. 11.

(1) Main Routine

Figure 16:
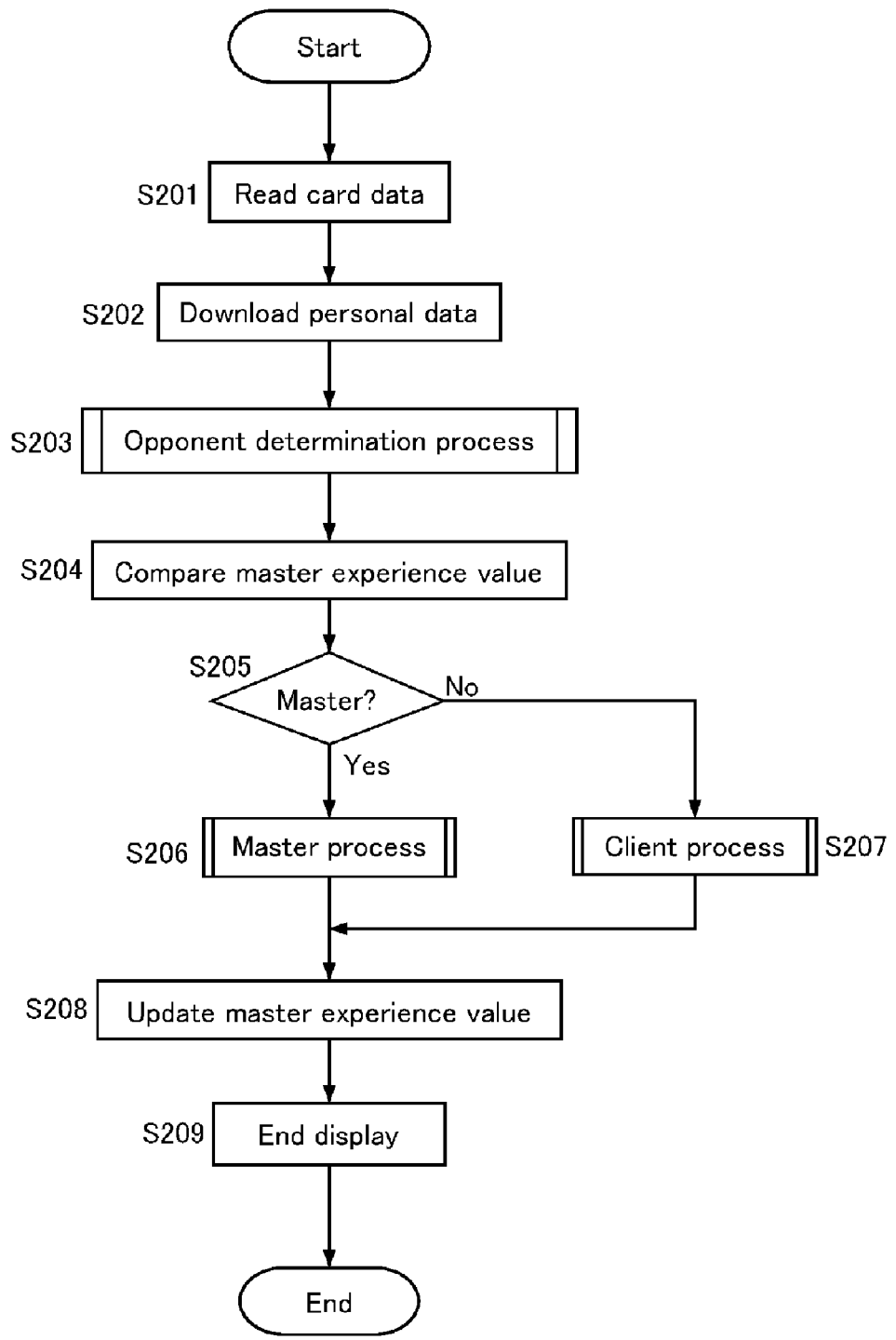
FIG. 16 is a flow diagram showing an example of the flow of the main routine performed by the terminal devices 200 (Embodiment 3).

FIG. 16 is a flow diagram showing an example of a flow of the main routine performed by the CPU 201 when the master is determined by the terminal devices 200. The CPU 201 determines the terminal device to become the master before the game is started and performs the process in accordance with whether it is the master or the client after determination.

Steps S201 to S203: A process similar to steps S1 through S3 in the main routine of Embodiment 1 is performed. Specifically, the CPU 201 downloads the personal data from the center server 100 based on the player IP recorded on the card reader/writer 212 and obtains the IP address of the opponent terminal device(s). The process to determine the opponent(s) is similar to that in Embodiment 1 (see FIG. 8).

Step S204: The CPU 201 receives the master experience values from the opponent terminal device(s), for example, and compares the master experience values of all the terminal devices playing against each other.

Step S205: The CPU 201 determines whether it becomes the master or not based on the comparison.

Steps S206 and S207: The CPU 201 performs the master process when it is the master in the game to be played (game playing means) (S206). When it is the client, it performs the client process (game playing means) (S207).

Step 208: The CPU 201 updates its master experience value.

Step 209: The CPU 201 displays the game results, uploads the personal data including the master experience value and the like to finish the process.

(2) Master Process

Figure 17:
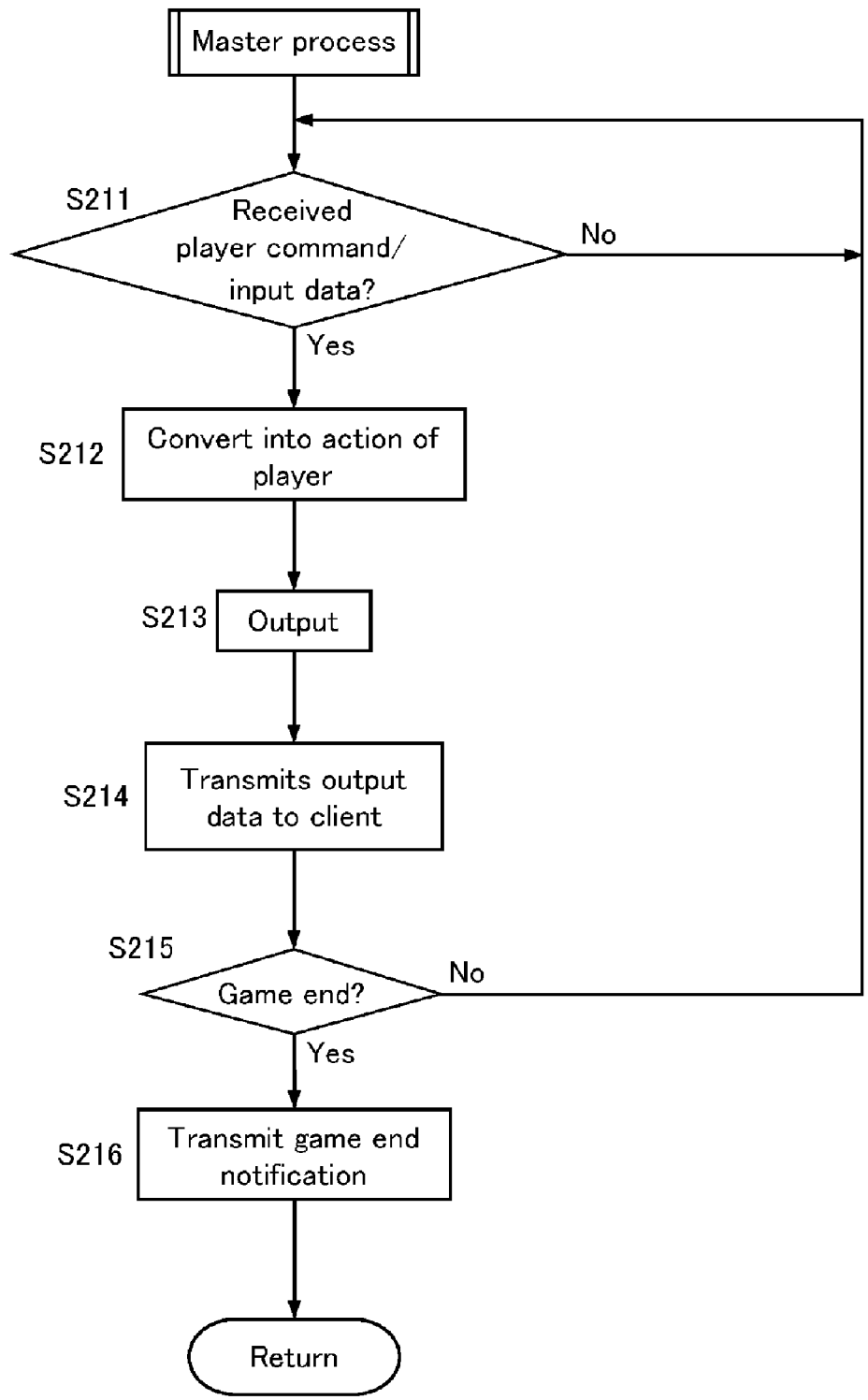
FIG. 17 is a flow diagram showing an example of the flow of the master process (Embodiment 3).

FIG. 17 is a flow diagram showing an example of a flow of the master process performed by the CPU 201 in step S206 of the main routine. In this process, the CPU 201 plays the game as the master.

Step S211: The CPU 201 waits for the commands input by the player at its terminal, or reception of the input data from the client terminal devices. If there is any, it proceeds to step S212.

Step S212: The CPU 201 converts the input data into an action of the characters such as players.

Step S213: The CPU 201 transmits output data to its drawing process unit 205 and/or audio reproduction unit 207, and controls output.

Step S214: The CPU 201 transmits the output data to the client terminal devices via the network 300.

Steps S215 and S216: The CPU 201 determines whether or not it is an end of the game (S215). When it is the end of the game (S215), the CPU 201 transmits the notification indicating the end of the game to all the other terminal devices 200 (S216).

(3) Client Process

Figure 18:
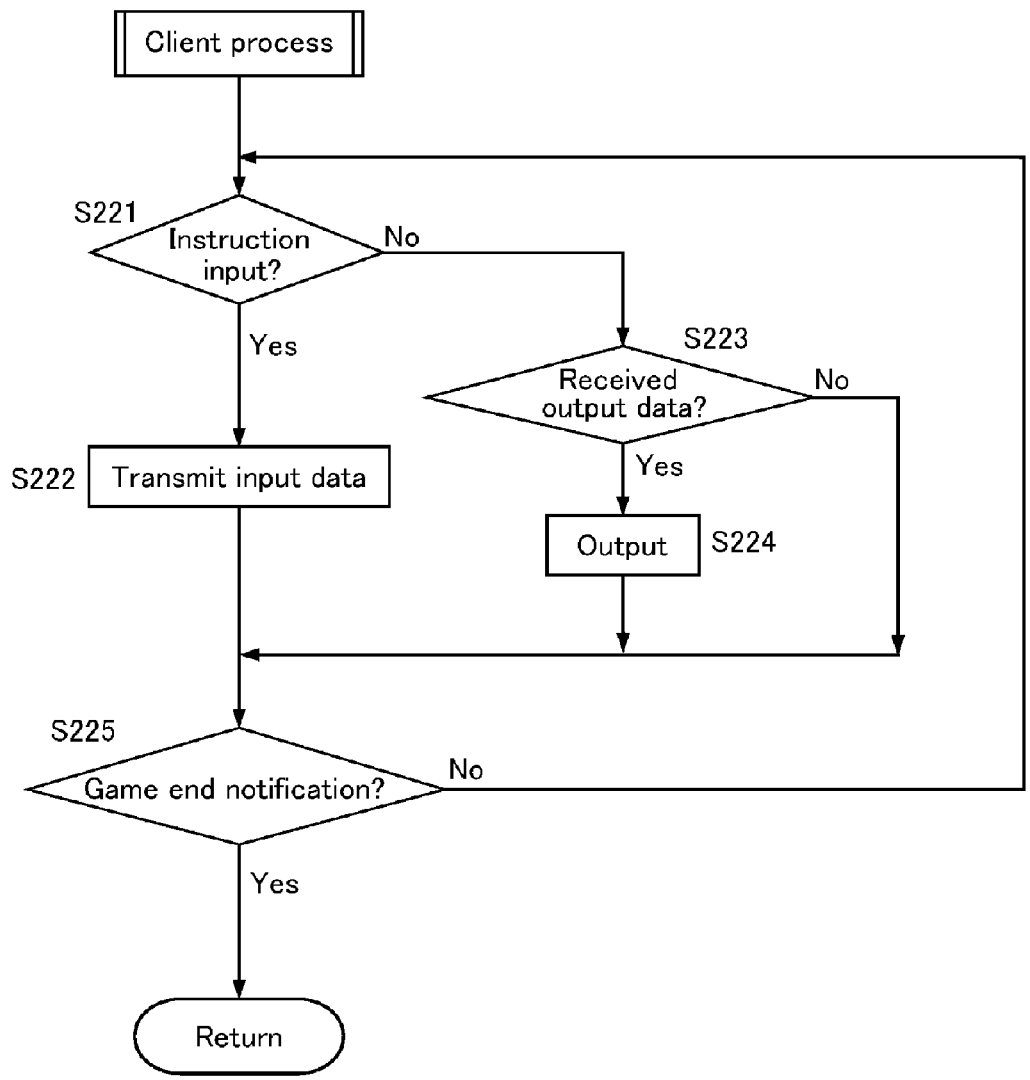
FIG. 18 is a flow diagram showing an example of the flow of a client process (Embodiment 3).

FIG. 18 is a flow diagram showing an example of a flow of a client process performed by the CPU 201 in step S207 in the main routine. In this process, the CPU 201 plays the game as the client.

Steps S221 and S222: The CPU 201 waits for the commands input from the player (S221), and transmits the input data to the master terminal device every time it receives the commands input (S222).

Steps S223 and S224: The CPU 201 waits for the reception of the output data from the master terminal device (S223), transmits the received output data to the drawing process unit 205 and/or the audio reproduction unit 207, and controls the screen output and/or audio output (S224).

Step S225: The CPU 201 repeats the above-described process until it receives the game end notification from the master terminal device. When it receives the game end notification, it returns to the main routine.

When the terminal devices play the game several times, the opportunity for each of the terminal devices to become the master are substantially equal. Thus, the influence of the gap in response in the game between the master terminal device and the client terminal devices on the outcomes of the games can be substantially eliminated. This allows players to enjoy any type of competitive game which is played via network in a fair manner.

Other Embodiments (A) The personal data of the players can be stored in magnetic cards of the players instead of being stored in the center server 100 as in Embodiment 1. In such a case, the center server 100 has to only update and transmit the registration list for searching opponent(s).

(B) The switching notification which also designates the next master terminal device can be transmitted to only the terminal device to become the master in the next game progress unit. In Embodiment 1, the switching notification serves as both the notification for specifying the next master terminal device and the end notification of the game progress unit. However, the notification designating the next master terminal device may be transmitted only to the next master terminal device and the end of the game progress unit may be notified to other terminals by another notification. For example, the end of the game progress unit can be notified with the start of the next game progress unit by the resumption notification transmitted by the next master terminal device to other terminal devices.

(C) It is preferable that the master terminal device notifies the client terminal devices of the end of the game progress unit. The client terminal devices received the notification may halt transmission of the data to the master terminal device. By halting useless transmission of the data from the master terminal device to the client terminal devices after the game progress unit is finished, a network load can be alleviated and a load of the process of the master terminal device can also be alleviated.

(D) In Embodiment 2, the master is determined based on the master experience time. However, the number of master experience units may be used instead of the master experience time. Herein, the number of master experience units refers to the number of the game progress units which a certain terminal device 200 plays as the master within one game. When the number of the game progress units is used, every time the terminal device becomes the master, "1" is added to the number of the master experience units (unit calculation means).

(E) In Embodiment 3, it is also possible that the center server 100 determines the terminal device to become the master based on the master experience values of the terminal devices. As an example, the case where the center server 100 stores the master experience values as a part of the personal data will be described. First, the center server 100 knows the combination of the terminal devices 200 which play against each other based on the IP addresses registered on the registration list. Then, the center server 100 reads out the master experience values of each of the terminal devices 200 which play against each other and determines the master terminal device based on the values. Thereafter, the center server 100 transmits the notification designating the master terminal device to the terminal devices 200 which play against each other. In this way, the terminal devices 200 can know which of the terminal devices is the master in the game to be played.

(F) In the above-described embodiments, the terminal devices 200 may have role notification means for notifying the players operating the terminal devices of whether they are the master or clients. For example, an output display or audio output indicating that it is the master or it is a client may be made from a monitor or a speaker connected to the terminal devices 200. This allows the players to have a strategy for the game in accordance with the role, for example, if the terminal is the master, concentrating on offence, or if the terminal is a client, concentrating on defense.

(G) The above-described embodiments can be carried out in combination as appropriate.

(H) The present invention includes programs for carrying out the above-described methods on computers and computer readable recording media on which such a program is recorded. The recording media may include computer readable/writable flexible discs, hard discs, semiconductor memories, CD-ROMs, DVDs, magneto-optical discs (MO), and the like.

According to the present invention, it is possible to alleviate the influence of a gap in response between a master terminal device and client terminal devices in competitive games which can be played via networks on the game environment of the players.

What is claimed is:

1. A competitive game system, comprising:
a plurality of terminal devices which are connected via a network, with one of the terminal devices being a master terminal device which manages the progress of the game and the remaining terminal devices being client terminal devices, each of the terminal devices recording a master experience time corresponding to a total length of time each terminal device has been the master terminal device in the game, the length of the time that one terminal device is the master terminal device is measured every time a terminal device becomes the master terminal device, and the master experience time is updated by adding the measured value to the master experience time of the terminal device;
wherein a game that includes a plurality of game progress units is played by transmitting and receiving data via the network to and the master terminal device and the client terminal devices including the master experience times for each of the plurality of the terminal devices;
before a start of one game progress unit, the master terminal device for the game progress unit to be started is determined such that the terminal device having the shortest master experience time being selected as the master terminal device for the next game progress unit being started;
the master terminal device is switched after the one game progress unit is completed; and
the master terminal device does not accept data from the client terminal devices when the master terminal device is being switched.

2. A competitive game system according to claim 1, wherein:
game data which is necessary for continuing the game is transmitted from the master terminal device to another terminal device that is become the next master terminal device; and
the master terminal device does not accept data from client terminal devices at least during transmission of the game data.

3. A competitive game system according to claim 1, wherein:
the master terminal device notifies the client terminal devices of the completion of the game progress unit; and
the client terminal devices which receive the notification halt transmission of data to the master terminal device.

4. A competitive game system according to claim 1, wherein the master terminal device is switched when the terminal devices do not receive input from players during the progress of the game.

5. A competitive game system according to claim 1, wherein the players operating the terminal devices are notified whether each respective terminal device is the master terminal device.

6. A competitive game system according to claim 1, wherein the plurality of terminal devices includes at least three terminal devices.

7. A competitive game method which can be executed by a plurality of terminal devices that are connected via a network, wherein one of the terminal devices will be a master terminal device that manages the progress of the game and the remaining terminal devices will becomes client terminal devices, the game method comprising the steps of:
executing a game that includes a plurality of game progress units by transmitting and receiving data to and from the master terminal device and the client terminal devices via the network;
recording master experience times corresponding to a total length of time each terminal device has been the master terminal device in the game, the length of the time that one terminal device is the master terminal device is measured every time a terminal device becomes the master terminal device, and the master experience time is updated by adding the measured value to the master experience time of the terminal device;
allowing the master terminal device or each respective terminal device to select the master terminal device before one game progress unit is started where the terminal device having the shortest master experience time is selected as the master terminal device for the next game progress unit being started;
allowing the master terminal device to switch the master terminal device after the one game progress unit is completed; and
allowing the master terminal device not to accept data from the client terminal devices when switching the master terminal device.

8. A competitive game method which is executed by a terminal device that is connected to other terminal devices via a network, comprising the steps of:
executing a game that includes a plurality of game progress units by making the terminal device or one of the other terminal devices a master terminal device which manages the progress of the game, and transmitting and receiving data to and from other terminal devices via the network;
recording master experience times corresponding to a total length of time each terminal device has been the master terminal device in the game, the length of the time that one terminal device is the master terminal device is measured every time a terminal device becomes the master terminal device, and the master experience time is updated by adding the measured value to the master experience time of the terminal device;
determining the master terminal device before an initial game progress unit is started, and when the terminal device is the master terminal device in a game progress unit, determining the master terminal device in the next game progress unit, where the terminal device having the shortest master experience time is selected as the master terminal device for the next game progress unit being started;
switching the master terminal device after the game progress unit is completed; and
controlling the master terminal device so that it will not accept data from the client terminal devices when the master terminal device is being switched.

9. A competitive game method which is executed by terminal devices that are connected via a network, the method comprising the steps of:
recording master experience times corresponding to a total length of time each terminal device has been the master terminal device in the game, the length of the time that one terminal device is the master terminal device is measured every time a terminal device becomes the master terminal device, and the master experience time is updated by adding the measured value to the master experience time of the terminal device;

making one of the terminal devices a master terminal device which manages the progress of the game, making the other terminal devices client terminal devices, and executing the game via a network, where the terminal device having the shortest master experience time is made the master terminal device for the next game progress unit being started.

* * * * *